US012239039B2

(12) United States Patent
Jin et al.

(10) Patent No.: US 12,239,039 B2
(45) Date of Patent: Mar. 4, 2025

(54) EFFICIENT TRANSPLANTING DEVICE WITH AUTOMATIC PICK-UP AND SUPPLEMENTATION FUNCTION

(71) Applicant: Henan University of Science and Technology, Luoyang (CN)

(72) Inventors: Xin Jin, Luoyang (CN); Qing Li, Luoyang (CN); Shuang Chen, Luoyang (CN); Xiaolin Xie, Luoyang (CN); Shengsheng Wang, Luoyang (CN); Liqiang Xiao, Luoyang (CN); Mengnan Liu, Luoyang (CN); Bo Zhao, Luoyang (CN)

(73) Assignee: Henan University of Science and Technology, Luoyang (CN)

( * ) Notice: Subject to any disclaimer, the term of this patent is extended or adjusted under 35 U.S.C. 154(b) by 0 days.

(21) Appl. No.: 18/827,337

(22) Filed: Sep. 6, 2024

(65) Prior Publication Data
US 2024/0423119 A1    Dec. 26, 2024

Related U.S. Application Data

(63) Continuation of application No. PCT/CN2024/089227, filed on Apr. 23, 2024.

(30) Foreign Application Priority Data

May 4, 2023    (CN) .......................... 202310487884.7

(51) Int. Cl.
*A01C 11/02*    (2006.01)
*A01C 11/00*    (2006.01)

(52) U.S. Cl.
CPC ............ *A01C 11/02* (2013.01); *A01C 11/006* (2013.01)

(58) Field of Classification Search
None
See application file for complete search history.

(56) References Cited

U.S. PATENT DOCUMENTS 5,557,881 A * 9/1996 Bouldin ............... A01G 9/0299
                                                47/1.01 R
5,881,655 A * 3/1999 Edmonds ............... A01G 9/083
                                                111/105

(Continued)

FOREIGN PATENT DOCUMENTS

CN        102893736 A      1/2013
CN        108738564 A     11/2018

(Continued)

OTHER PUBLICATIONS

China National intellectual Property Administration, Notification to Grant Patent Right for Invention of Chinese application No. 202310487884.7 issued on Apr. 19, 2024, which is foreign counterpart application of this US application.

(Continued)

*Primary Examiner* — Kavel Singh

(57) ABSTRACT

An efficient transplanting device with an automatic seedling pick-up and supplementation function includes a seedling pick-up device, a seedling discharging device, and a seedling supplementation device. The seedling discharging device is used to discharge plug seedlings for transplantation; the seedling pick-up device is used to transfer the plug seedlings and the seedling supplementation device is used to supplement the plug seeding. A seedling pick-up photoelectric sensor, a detection camera, and a controller are provided for the operations of plug seedling pick-up, supplementation and discharge of the plug seedlings.

5 Claims, 5 Drawing Sheets

(56) References Cited

U.S. PATENT DOCUMENTS

| | | | |
|---|---|---|---|
| 5,911,631 A | * | 6/1999 | Bouldin ............... A01G 9/086 47/1.01 R |
| 9,635,804 B2 | * | 5/2017 | Carr ..................... A01C 7/042 |
| 10,582,655 B2 | * | 3/2020 | Kowalchuk ............ B05B 12/06 |
| 11,337,364 B2 | * | 5/2022 | Williames ............ A01G 9/0299 |
| 11,490,558 B2 | * | 11/2022 | Johnson ............... A01C 7/102 |

FOREIGN PATENT DOCUMENTS

| | | | | |
|---|---|---|---|---|
| CN | 108934337 A | | 12/2018 | |
| CN | 108934337 B | * | 6/2020 | .......... A01C 11/025 |
| CN | 111247920 A | | 6/2020 | |
| CN | 115053676 A | | 9/2022 | |
| CN | 115316255 A | * | 11/2022 | |
| CN | 116267142 A | | 6/2023 | |
| JP | 07184421 A | | 7/1995 | |
| JP | 07308126 A | | 11/1995 | |
| JP | 08205621 A | | 8/1996 | |
| JP | 2002051617 A | * | 2/2002 | |

OTHER PUBLICATIONS

International Search Report of the International Searching Authority for State Intellectual Property Office of the People's Republic of China in PCT application No. PCT/CN2024/089227 issued on Jul. 18, 2024, which is an international application to which this application claims priority.

Hu, Jianping, et al., "Design and test of control system for whole row seedling taking and interval seedling throwing of self-propelled transplanter", Laboratory of Modern Agricultural Equipment and Technology Education Department of Jiangsu University, Zhenjiang and Laboratory for Research on Agricultural Equipment and Intelligent Technology in Jiangsu Province, Zhenjiang, Jun. 25, 2018.

* cited by examiner

EFFICIENT TRANSPLANTING DEVICE WITH AUTOMATIC PICK-UP AND SUPPLEMENTATION FUNCTION

CROSS-REFERENCE TO RELATED APPLICATION

This application is a continuation application of international application No. PCT/CN2024/089227, filed on Apr. 23, 2024, which claims priority to Chinese Patent Application No. 202310487884.7, filed on May 4, 2023, the disclosures of which are herein incorporated by reference in their entireties.

TECHNICAL FIELD

The present application relates to the field of transplanting devices, and in particular, to an efficient transplanting device with an automatic seedling pick-up and supplementation function.

BACKGROUND

In a cultivation process of plug seedlings, various factors may cause differences in the shapes of plug seedlings, such as heights, colors, and thicknesses of the plug seedlings. In addition, when a seedling pick-up mechanical claw picks up and drops seedlings, there may be a grabbing failure, a dropping failure, and the like. In these cases, if no seedlings are used for supplementation, there may be non-survival and omission during transplantation, which directly affects the quality of transplantation. At present, a seedling weed-out technology for plug seedlings is still immature and requires manual operation in most cases. An existing automatic transplanting machine has a high demand for seedling selection and supplementation, and has a narrow range of applications. There is an urgent need for technological breakthrough.

SUMMARY

Embodiments of the present disclosure aim to provide an efficient transplanting device with an automatic seedling pick-up and supplementation function, which improves the operation quality of plug seedlings and enhances the operation effect of an automatic transplanting machine.

The technical solutions used in the present disclosure to solve the technical problems above are as follows: an efficient transplanting device with an automatic seedling pick-up and supplementation function includes a seedling pick-up device, a seedling discharging device, and a seedling supplementation device, wherein the seedling discharging device includes a seedling discharging plate; the seedling discharging plate is provided with a conveyor belt base; an upper conveyor belt and a lower conveyor belt are arranged on an outer side of the conveyor belt base; lengthwise directions of both the upper conveyor belt and the lower conveyor belt are horizontal; the lower conveyor belt is located between the seedling discharging plate and the upper conveyor belt; projections of both the upper conveyor belt and the lower conveyor belt facing the seedling discharging plate overlap; the upper conveyor belt is connected with a plurality of seedling dropping cups at intervals; an upper conveying motor capable of driving the upper conveyor belt to move is mounted on the conveyor belt base; the lower conveyor belt is connected with a plurality of seedling dropping cups at intervals too; a lower conveying motor capable of driving the lower conveyor belt to move is mounted on the conveyor belt base, thereby forming a first seedling dropping cup group capable of moving around the conveyor belt base along the upper conveyor belt, and a second seedling dropping cup group capable of moving around the conveyor belt base along the lower conveyor belt;

one side of the conveyor belt base is a seedling discharging side; a seedling discharging port is provided on the seedling discharging plate close to the seedling discharging side; the seedling discharging port is covered with a seedling discharging sliding plate; a sliding plate cylinder capable of driving the seedling discharging sliding plate to be opened or closed is arranged on the seedling discharging plate. a section of the upper conveyor belt and a section of the lower conveyor belt, which are located on the seedling discharging side, are both seedling discharging sections that extend in a straight line in a transverse direction of the conveyor belt base; one side of the conveyor belt base facing away from the seedling discharging side is a seedling pick-up side; a section of the upper conveyor belt and a section of the lower conveyor belt, which are located on the seedling pick-up side, are both seedling pick-up sections parallel to the seedling discharging section; lengths of the seedling discharging section and the seedling pick-up section satisfy that the first seedling dropping cup group and the second seedling dropping cup group can be respectively located on the seedling discharging sections or the seedling pick-up sections; the plurality of seedling dropping cups of the first seedling dropping cup group or the second seedling dropping cup group located in the seedling discharging sections can pass through a position directly above the seedling discharging port in sequence, so that the plug seedlings downwards pass through bottom openings of the seedling dropping cups and the seedling discharging port in sequence;

one of two transverse ends of the conveyor belt base is a seedling supplementation side; a section of the upper conveyor belt and a section of the lower conveyor belt, which are located on the seedling supplementation side, are seedling supplementation sections that extend in a straight line in a longitudinal direction of the conveyor belt base; the seedling supplementation sections are perpendicular to the seedling discharging sections; movement directions of the first seedling dropping cup group and the second seedling dropping cup group are from the seedling pick-up sections to the seedling supplementation sections, and then from the seedling supplementation sections to the seedling discharging sections; the seedling supplementation device is located on the seedling supplementation side and is close to the seedling supplementation sections; the seedling pick-up device is located on the seedling pick-up side and is close to the seedling pick-up sections;

the seedling pick-up device includes a plug seedling conveyor belt; the plug seedling conveyor belt can simultaneously convey a plurality of plug seedlings to a seedling pick-up position; the seedling pick-up position is located on one side of the plug seedling conveyor belt close to the seedling pick-up sections; a supporting rod is arranged on an outer side of the plug seedling conveyor belt; a top end of the supporting rod is connected with a cover plate; a longitudinal guide rail is arranged on a bottom side of the cover plate; a sliding block is arranged on the longitudinal guide rail; the sliding block is connected with a top end of a lifting cylinder; the cover plate is further provided with a longitudinal conveying motor capable of driving the sliding block and the lifting cylinder to move along the longitudinal guide rail; a bottom end of the lifting cylinder is connected with a transverse extension and retraction device and a transverse cylinder capable of driving the transverse extension and retraction device to extend and contract in the transverse direction; a plurality of seedling pick-up mechanisms are mounted at intervals on the transverse extension and retraction device; each seedling pick-up mechanism includes a seedling pick-up cylinder and a seedling pick-up claw;

a seedling pick-up photoelectric sensor is arranged on one side of the plug seedling conveyor belt; when the seedling pick-up photoelectric sensor detects the plug seedlings at the seedling pick-up position, a controller enables the longitudinal conveying motor, the lifting cylinder, and the transverse cylinder to cooperate to drive the plurality of seedling pick-up mechanisms to longitudinally approach the seedling pick-up position and transversely get together, thereby causing the plurality of seedling pick-up mechanisms to move above the plurality of plug seedlings located at the seedling pick-up position; a detection camera is arranged on a top side of the conveyor belt base; the detection camera can take photos of the plurality of plug seedlings located at the seedling pick-up position, so that the controller can recognize high-quality seedlings and low-quality seedlings at the seedling pick-up position; the controller can enable the pick-up cylinder located above the high-quality seedlings to drive the seedling pick-up claw to be opened and pick up the high-quality seedlings; after the seedling pick-up claw picks up the high-quality seedlings, the controller can make the longitudinal conveying motor, the lifting cylinder, and the transverse cylinder cooperate to drive the plurality of seedling pick-up mechanisms to longitudinally approach the seedling pick-up sections and be transversely separated, so that the plurality of seedling pick-up mechanisms respectively move above the plurality of seedling dropping cups of the first seedling dropping cup group or the second seedling dropping cup group located at the seedling pick-up sections; the controller can opens the seedling pick-up claw located above the seedling dropping cups, so that the plurality of high-quality seedlings fall into top openings of the plurality of seedling dropping cups of the first seedling dropping cup group or the second seedling dropping cup group respectively;

the seedling supplementation device includes a seedling supplementation plate; the seedling supplementation plate is horizontally arranged and is located above the seedling dropping cups at the seedling supplementation sections; a seedling supplementation conveyor belt is mounted above the seedling supplementation plate; the seedling supplementation conveyor belt is connected with a plurality of seedling supplementation cups; seedling supplementation conveying motor capable of driving the seedling supplementation conveyor belt to move is mounted on the seedling supplementation plate, thereby forming a seedling supplementation cup group capable of cyclically moving along with the seedling supplementation conveyor belt; a seedling supplementation port is provided on one side of the seedling supplementation plate close to the seedling supplementation sections; the seedling supplementation port is aligned with a bottom opening of the seedling supplementation cup located above the seedling supplementation port and the top opening of the seedling dropping cup located below the seedling supplementation port at the same time; a seedling supplementation photoelectric sensor is arranged on the top side of the conveyor belt base; and when the seedling supplementation photoelectric sensor detects that the seedling dropping cup located below the seedling supplementation port is empty, the controller can stop the movements of the upper conveyor belt and the lower conveyor belt, and make the seedling supplementation conveying motor to drive the seedling supplementation cup group to move, so that a seedling supplementation cup with a high-quality seedling moves above the seedling supplementation port, and the high-quality seedling stored in the seedling supplementation cup group falls into the empty seedling dropping cup.

In some embodiments, a first seedling discharging port and a second seedling discharging port are provided on the seedling discharging plate close to the seedling discharging side; a bottom side of the first seedling discharging port is covered with a first seedling discharging sliding plate; a first sliding plate cylinder capable of driving the first seedling discharging sliding plate to be opened or closed is arranged on a bottom side of the seedling discharging plate; a bottom side of the second seedling discharging port is covered with a second seedling discharging sliding plate; and a second sliding plate cylinder capable of driving the second seedling discharging sliding plate to be opened or closed is arranged on the bottom side of the seedling discharging plate.

In some embodiments, a quantity of the seedling dropping cups of the first seedling dropping cup group and a quantity of the seedling dropping cups of the second seedling dropping cup group are the same, and the seedling discharging sections and the seedling pick-up sections have the same lengths.

In some embodiments, a conveying direction of the plug seedling conveyor belt is parallel to the longitudinal direction; two supporting rods are arranged on one side of the plug seedling conveyor belt close to the seedling pick-up sections; top ends of the two supporting rods are in matching connection with a cover plate; two longitudinal guide rails are arranged on a bottom side of the cover plate; sliding blocks are respectively arranged on the two longitudinal guide rails; the two sliding blocks are respectively connected with top ends of respective lifting cylinders; two longitudinal conveying motors capable of respectively driving the two sliding blocks to move are arranged on the cover plate; bottom ends of the two lifting cylinders are respectively connected with a transverse extension and retraction device and a transverse cylinder; and the two transverse cylinders can drive the two transverse extension and retraction devices to extend or retract in opposite directions.

In some embodiments, the seedling discharging plate is a rectangular flat plate; the seedling supplementation plate is a circular flat plate; the seedling supplementation conveyor belt is horizontally arranged; a projection of the seedling supplementation conveyor belt facing the seedling supplementation plate is circular; and the projections of the upper conveyor belt and the lower conveyor belt facing the seedling discharging plate are the same rectangle.

According to the above technical solutions, the present disclosure has the beneficial effects:

In the present disclosure, the seedling discharging device is used to discharge plug seedlings for transplantation; and the seedling pick-up device is used to transfer the plug seedlings. Furthermore, in a seedling pick-up process, low-quality plug seedlings can be recognized, and only high-quality plug seedlings can be transferred. Then, the seedling supplementation device is used to supplement seedlings to vacant positions caused by the low-quality plug seedlings. The efficient transplanting device can replace a worker to remove the low-quality plug seedlings and automatically achieve supplementation of plug seedlings in case of a grabbing failure or low-quality plug seedlings, thus avoiding a dropping failure caused by empty seedling dropping cups. The seedling pick-up mechanism can move up and down during front and back operations, flexibly pick up seedlings, and can flexibly change a transplanting rate and a transplanting hole distance, so that the efficient transplanting device is beneficial for achieving multiple purposes, enhances the automation degree of transplanting equipment, and improves the operation efficiency and quality of the transplanting equipment.

Figure 1:
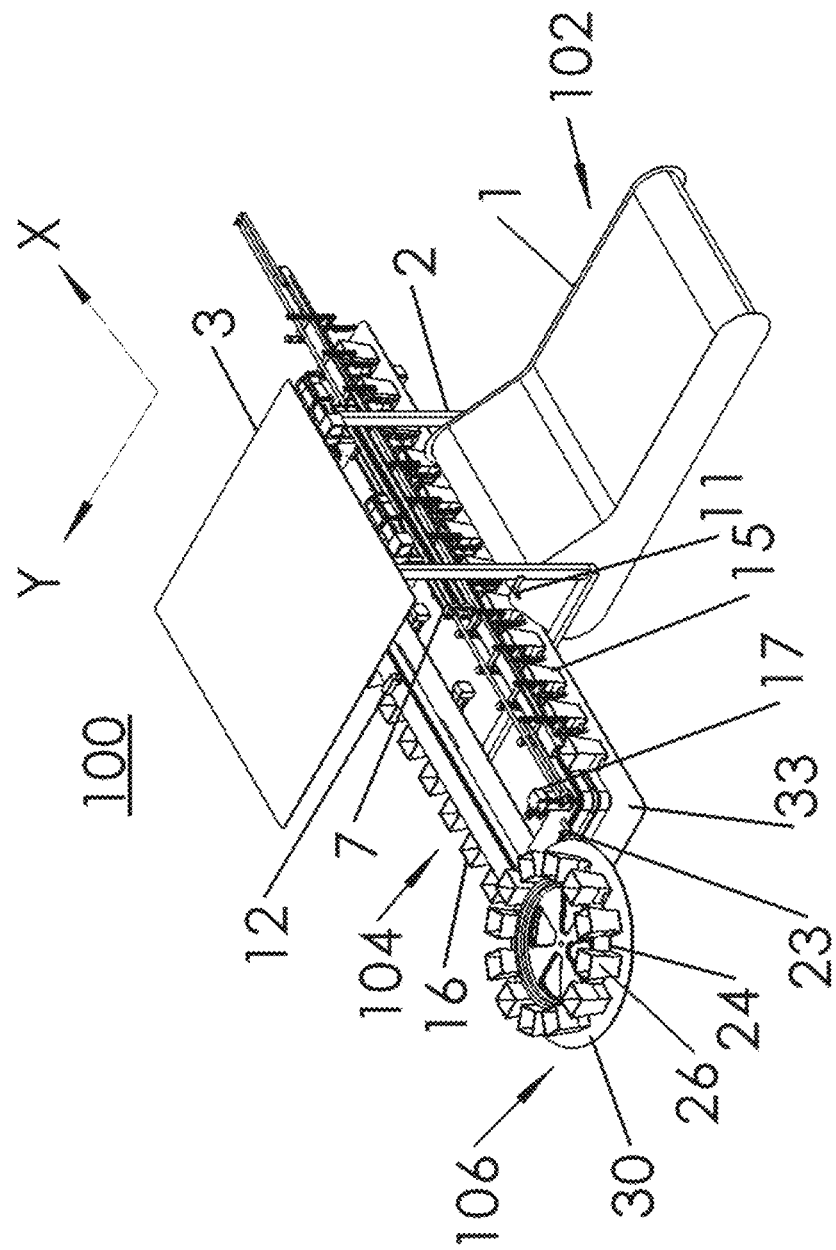
FIG. 1 is a three-dimensional diagram of a perspective view of an efficient transplanting device according to one embodiment of the present disclosure.

Numerals in the drawings: 1: plug seedling conveyor belt; 2: supporting rod; 3: cover plate; 4: longitudinal guide rail; 5: longitudinal conveying motor; 6: lifting cylinder; 7: transverse cylinder; 8: transverse extension and retraction device; 9: seedling pick-up cylinder; 10: seedling pick-up claw; 11: seedling pick-up photoelectric sensor; 12: detection camera; 13: upper conveyor belt; 14: lower conveyor belt; 15: first seedling dropping cup group; 16: second seedling dropping cup group; 17: upper conveying motor; 18: lower conveying motor; 19: first seedling discharging port; 20: second seedling discharging port; 21: first sliding plate cylinder; 22: second sliding plate cylinder; 23: seedling supplementation photoelectric sensor; 24: seedling supplementation conveyor belt; 25: seedling supplementation conveying motor; 26: seedling supplementation cup group; 27: seedling supplementation port; 28: first seedling discharging sliding plate; and 29: second seedling discharging sliding plate.

DETAILED DESCRIPTION OF DRAWINGS

Referring to the accompanying drawings, specific implementations are described.

Figure 3:
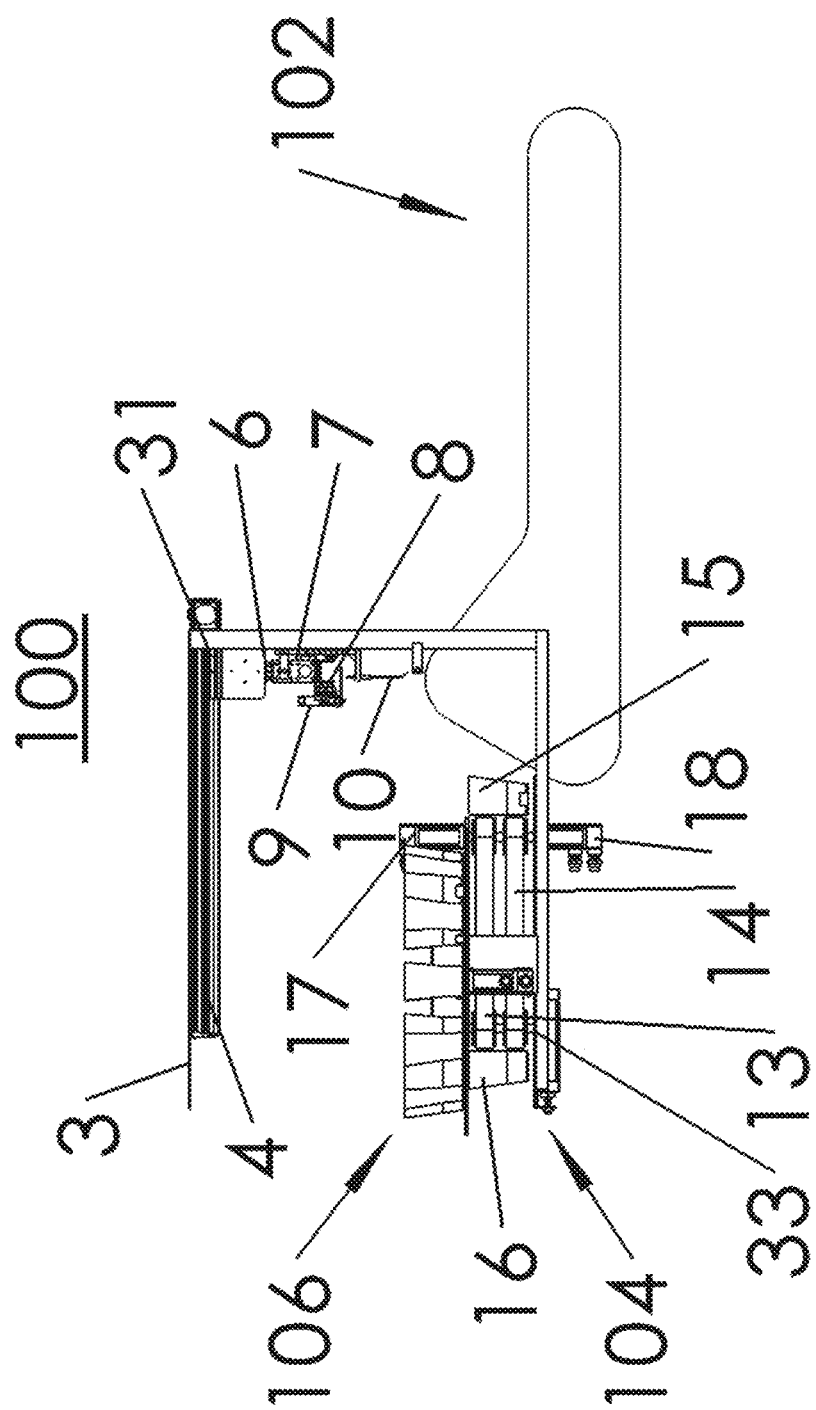
FIG. 3 is a schematic diagram of a side view of the efficient transplanting device of the present disclosure.

FIG. 1 is a perspective view of an efficient transplanting device 100 according to one embodiment of the present disclosure, and FIG. 3 is a side view of the efficient transplanting device 100. Referring to FIG. 1 and FIG. 3, the efficient transplanting device 100 with an automatic seedling pick-up and supplementation function includes a seedling pick-up device 102, a seedling discharging device 104, and a seedling supplementation device 106. The seedling discharging device 104 includes a seedling discharging plate 33. In some embodiments, the seedling discharging plate 33 is a rectangular flat plate, and is used as a conveyor belt base. The seedling discharge plate and the conveyor belt base are used interchangeably in the present disclosure. An upper conveyor belt 13 and a lower conveyor belt 14 are arranged on an outer side portion of the conveyor belt base 33; lengthwise directions of both the upper conveyor belt 13 and the lower conveyor belt 14 are horizontal; the lower conveyor belt 14 is located between the seedling discharging plate and the upper conveyor belt 13; and projections of the upper conveyor belt 13 and the lower conveyor belt 14 facing the seedling discharging plate are the rectangle have the same size.

Referring to FIG. 1 to FIG. 4, the upper conveyor belt 13 is connected with a plurality of seedling dropping cups at intervals; an upper conveying motor 17 capable of driving the upper conveyor belt 13 to move is mounted on the conveyor belt base; the lower conveyor belt 14 is connected with a plurality of seedling dropping cups at intervals; and a lower conveying motor 18 capable of driving the lower conveyor belt 14 to move is mounted on the conveyor belt base, thereby forming a first seedling dropping cup group 15 capable of moving around the conveyor belt base 33 along the upper conveyor belt 13, and a second seedling dropping cup group 16 capable of moving around the conveyor belt base 33 along the lower conveyor belt 14.

Figure 4:
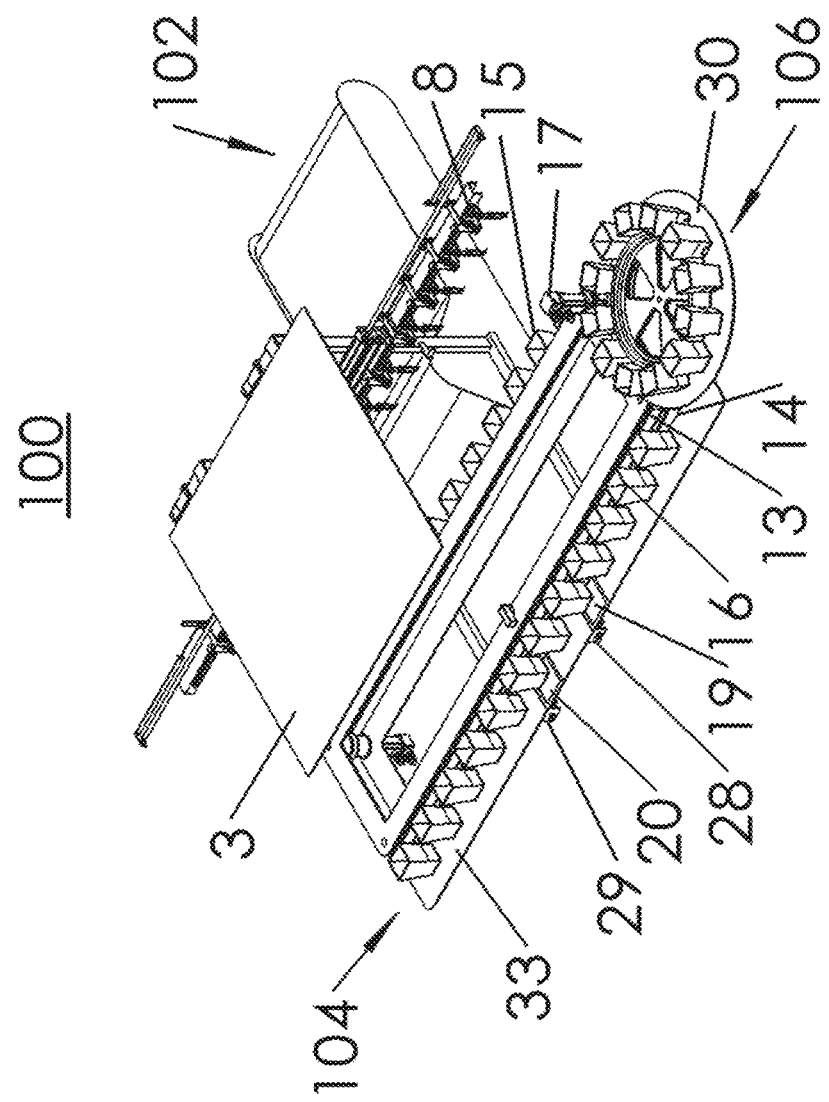
FIG. 4 is a three-dimensional diagram of another perspective view of the efficient transplanting device of the present disclosure.
Figure 5:
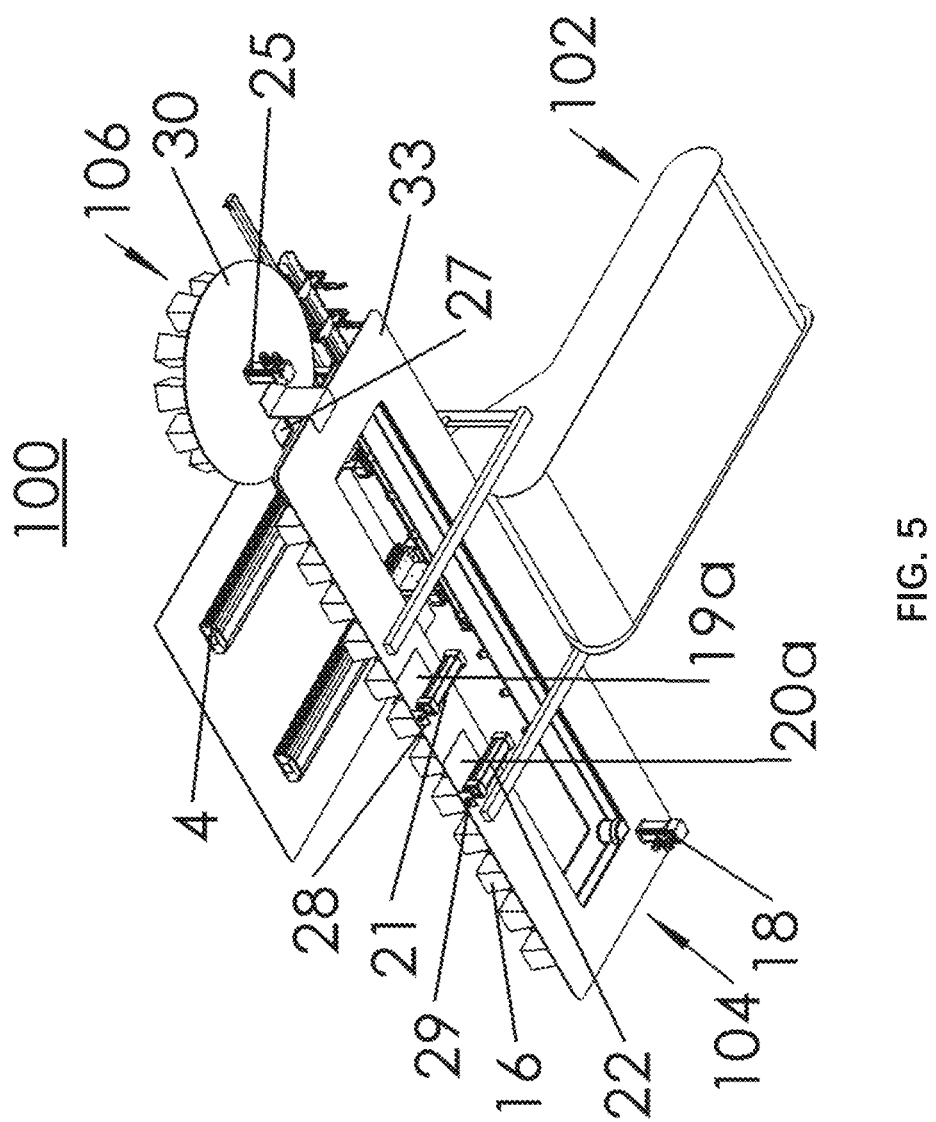
FIG. 5 is a three-dimensional diagram of another perspective view of the efficient transplanting device of the present disclosure.

Referring to FIG. 4 and FIG. 5, one side of the conveyor belt base 33 is a seedling discharging side; a first seedling discharging port 19 and a second seedling discharging port 20 are provided on the seedling discharging plate 33 close to the seedling discharging side; a bottom cover 19a of the first seedling discharging port 19 is provided under the seedling discharging plate 33 and is connected with a first seedling discharging sliding plate 28, and a bottom side of the seedling discharging plate 33 is further provided with a first sliding plate cylinder 21 capable of driving the first seedling discharging sliding plate 28 to move the bottom cover 19a for opening and closing the first seedling discharging port 19. A bottom cover 20a of the second seedling discharging port 20 is provided under the seedling discharging plate 33, and is connected with a second seedling discharging sliding plate 29; and the bottom side of the seedling discharging plate 33 is further provided with a second sliding plate cylinder 22 capable of driving the second seedling discharging sliding plate 29 to move for opening and closing the second seedling discharging port 20. In some embodiments, the first seedling discharging sliding plate 28 and the bottom cover 19a are an integrated component, and the second seedling discharging sliding plate 29 and the bottom cover 20a are an integrated component.

Turning to FIG. 1, a section of the upper conveyor belt 13 and a section of the lower conveyor belt 14, which are located on the seedling discharging side, are both seedling discharging sections that extend in a straight line in a transverse direction X of the conveyor belt base; and one side of the conveyor belt base 33 facing away from the seedling discharging side is a seedling pick-up side. A section of the upper conveyor belt 13 and a section of the lower conveyor belt 14, which are located on the seedling pick-up side, are both seedling pick-up sections parallel to the seedling discharging section; lengths of the seedling discharging sections and the seedling pick-up sections are configured such that the first seedling dropping cup group 15 and the second seedling dropping cup group 16 are located on the seedling discharging sections and the seedling pick-up sections, respectively; and the plurality of seedling dropping cups of the first seedling dropping cup group 15 or the second seedling dropping cup group 16 located at the seedling discharging sections can pass through a position directly above the seedling discharging ports in sequence, so that the plug seedlings downwards pass through bottom openings of the seedling dropping cups and the seedling discharging port in sequence.

One of two transverse ends of the conveyor belt base 33 is a seedling supplementation side; a section of the upper conveyor belt 13 and a section of the lower conveyor belt 14, which are located on the seedling supplementation side, are seedling supplementation sections that extend in a straight line in a longitudinal direction Y of the conveyor belt base; the seedling supplementation sections are perpendicular to the seedling discharging sections; movement directions of the first seedling dropping cup group 15 and the second seedling dropping cup group 16 are from the seedling pick-up sections to the seedling supplementation sections, and then from the seedling supplementation sections to the seedling discharging sections; the seedling supplementation device 106 is located on the seedling supplementation side and is close to the seedling supplementation sections; and the seedling pick-up device 102 is located on the seedling pick-up side, and is close to the seedling pick-up sections. In this embodiment, each of the first seedling dropping cup group 15 and the second seedling dropping cup group 16 include 12 seedling dropping cups, and the seedling discharging sections and the seedling pick-up sections have the same lengths.

Figure 2:
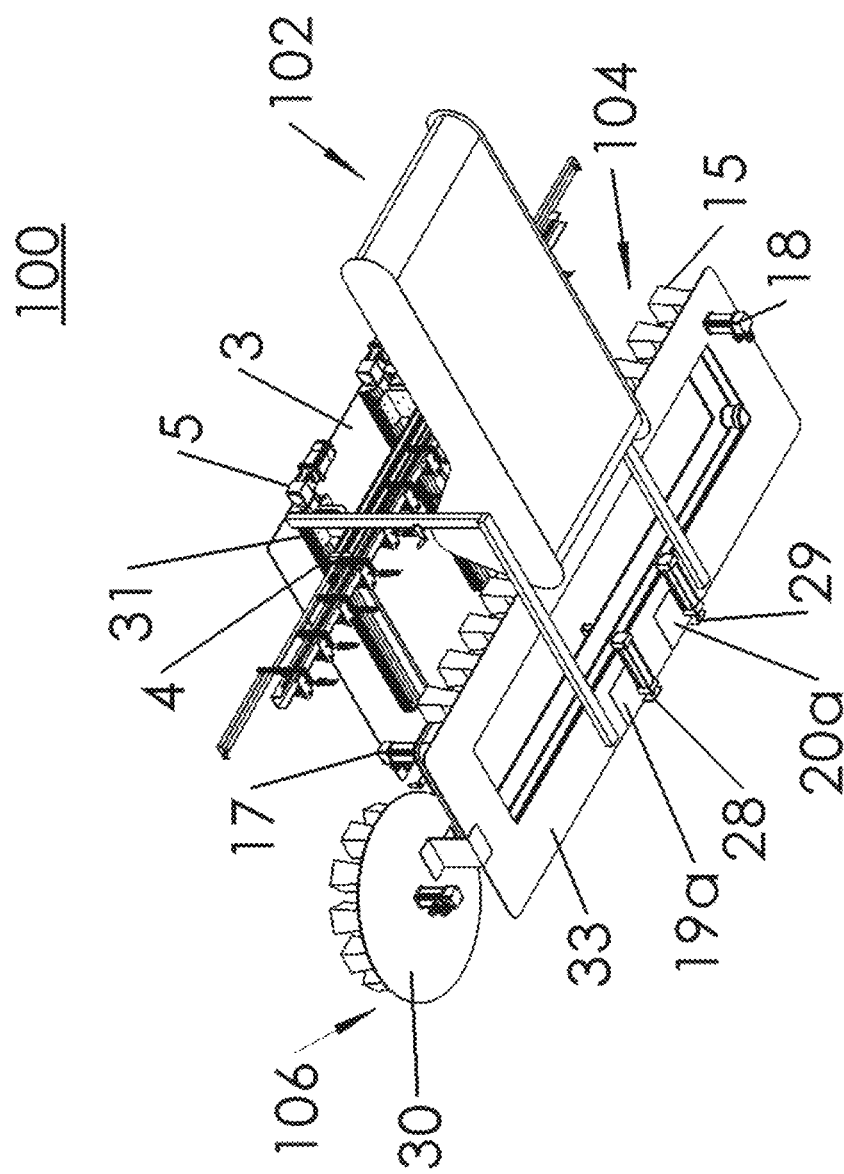
FIG. 2 is a three-dimensional diagram of another perspective view of the efficient transplanting device of the present disclosure.

Referring to FIG. 1 to FIG. 5, the seedling pick-up device 102 includes a plug seedling conveyor belt 1; the plug seedling conveyor belt 1 can simultaneously convey a plurality of plug seedlings to a seedling pick-up position; a conveying direction of the plug seedling conveyor belt 1 is parallel to a longitudinal direction Y; the seedling pick-up position is located on one side of the plug seedling conveyor belt 1 close to the seedling pick-up sections. Two supporting rods 2 are arranged on one side of the plug seedling conveyor belt 1 close to the seedling pick-up sections; top ends of the two supporting rods 2 are in matching connection with a cover plate 3; two longitudinal guide rails 4 are arranged on a bottom side of the cover plate 3 as illustrated in FIG. 5. Referring to FIGS. 2 and 3, sliding blocks 31 are respectively arranged on the two longitudinal guide rails 4; and the two sliding blocks 31 are respectively connected with top ends of respective lifting cylinders 6. Two longitudinal conveying motors 5 capable of respectively driving the two sliding blocks and the lifting cylinders 6 to move along the longitudinal guide rails 4 are further arranged on the cover plate 3; bottom ends of the two lifting cylinders 6 are respectively connected with a transverse extension and retraction device 8 and a transverse cylinder 7; the two transverse cylinders 7 can drive the two transverse extension and retraction devices 8 to extend or retract in opposite directions; and a plurality of seedling pick-up mechanisms are mounted at intervals on the transverse extension and retraction devices 8; and each seedling pick-up mechanism includes a seedling pick-up cylinder 9 and a seedling pick-up claw 10.

Referring to FIG. 1 and FIG. 5, a seedling pick-up photoelectric sensor 11 is arranged on one side of the plug seedling conveyor belt 1. When the seedling pick-up photoelectric sensor 11 detects the plug seedlings at the seedling pick-up position, a controller can enable the longitudinal conveying motors 5, the lifting cylinders 6, and the transverse cylinders 7 to cooperate to drive the plurality of seedling pick-up mechanisms to longitudinally approach the seedling pick-up position and transversely get together, thereby causing the plurality of seedling pick-up mechanisms to move above the plurality of plug seedlings located at the seedling pick-up position. A detection camera 12 is arranged on a top side of the conveyor belt base 33; and the detection camera 12 can take photos of the plurality of plug seedlings located at the seedling pick-up position, so that the controller can recognize high-quality seedlings and low-quality seedlings at the seedling pick-up position.

After the recognition is completed, the controller can enable the pick-up cylinder 9 located above the high-quality seedlings to drive the seedling pick-up claw 10 to be opened and pick up the high-quality seedlings. After the seedling pick-up claw 10 picks up the high-quality seedlings, the controller can make the longitudinal conveying motors 5, the lifting cylinders 6, and the transverse cylinders 7 cooperate to drive the plurality of seedling pick-up mechanisms to longitudinally approach the seedling pick-up sections and be transversely separated, so that the plurality of seedling pick-up mechanisms move above the plurality of seedling dropping cups of the first seedling dropping cup group 15 or the second seedling dropping cup group 16 located at the seedling pick-up sections. The controller can open the seedling pick-up claw 10 located above the seedling dropping cups, so that the plurality of high-quality seedlings fall into top openings of the plurality of seedling dropping cups of the first seedling dropping cup group 15 or the second seedling dropping cup group 16, respectively.

Referring to FIG. 1 and FIG. 5, the seedling supplementation device 106 includes a seedling supplementation plate 30; the seedling supplementation plate 30 is horizontally arranged and is located above the seedling dropping cups at the seedling supplementation sections; a seedling supplementation conveyor belt 24 is mounted above the seedling supplementation plate 30; the seedling supplementation conveyor belt 24 is horizontally arranged; a projection of the seedling supplementation conveyor belt 24 facing the seedling supplementation plate is circular; the seedling supplementation conveyor belt 24 is connected with a plurality of seedling supplementation cups; and a seedling supplementation conveying motor 25 capable of driving the seedling supplementation conveyor belt 24 to move is mounted on the seedling supplementation plate 30, thereby forming a seedling supplementation cup group 26 capable of cyclically moving along with the seedling supplementation conveyor belt 24.

Continuing with FIG. 1 and FIG. 5, a seedling supplementation port 27 is provided on one side of the seedling supplementation plate 30 close to the seedling supplementation sections; the seedling supplementation port 27 is aligned with a bottom opening of the seedling supplementation cup located above the seedling supplementation port and the top opening of the seedling dropping cup located below the seedling supplementation port at the same time; and a seedling supplementation photoelectric sensor 23 is arranged on the top side of the conveyor belt base 33. When the seedling supplementation photoelectric sensor 23 detects that the seedling dropping cup located below the seedling supplementation port 27 is empty, the controller can stop the movements of the upper conveyor belt 13 and the lower conveyor belt 14, and makes the seedling supplementation conveying motor 25 to drive the seedling supplementation cup group 26 to move, so that a seedling supplementation cup with a high-quality seedling moves above the seedling supplementation port 27, and the high-quality seedling stored in the seedling supplementation cup group 26 falls into the empty seedling dropping cup. Therefore, plug seedlings can be automatically supplemented in a case of a grabbing failure or low-quality plug seedlings, and a dropping failure caused by an empty seedling dropping cup is avoided.

What is claimed is:

1. An efficient transplanting device with an automatic seedling pick-up and supplementation function, comprising: a seedling pick-up device, a seedling discharging device, and a seedling supplementation device, wherein the seedling discharging device comprises a seedling discharging plate; the seedling discharging plate is provided with a conveyor belt base; an upper conveyor belt (13) and a lower conveyor belt (14) are arranged on an outer side of the conveyor belt base; lengthwise directions of both the upper conveyor belt (13) and the lower conveyor belt (14) are horizontal; the lower conveyor belt (14) is located between the seedling discharging plate and the upper conveyor belt (13); projections of both the upper conveyor belt (13) and the lower conveyor belt (14) facing the seedling discharging plate overlap; the upper conveyor belt (13) is connected with a plurality of seedling dropping cups at intervals; an upper conveying motor (17) capable of driving the upper conveyor belt (13) to move is mounted on the conveyor belt base; the lower conveyor belt (14) is connected with a plurality of seedling dropping cups at intervals too; a lower conveying motor (18) capable of driving the lower conveyor belt (14) to move is mounted on the conveyor belt base, thereby forming a first seedling dropping cup group (15) capable of moving around the conveyor belt base along the upper conveyor belt (13), and a second seedling dropping cup group (16) capable of moving around the conveyor belt base along the lower conveyor belt (14);

one side of the conveyor belt base is a seedling discharging side; a seedling discharging port is provided on the seedling discharging plate close to the seedling discharging side; the seedling discharging port is provided with a seedling discharging sliding plate; a sliding plate cylinder capable of driving the seedling discharging sliding plate to be opened or closed is arranged on the seedling discharging plate; a section of the upper conveyor belt (13) and a section of the lower conveyor belt (14), which are located on the seedling discharging side, are both seedling discharging sections that extend in a straight line in a transverse direction of the conveyor belt base; one side of the conveyor belt base facing away from the seedling discharging side is a seedling pick-up side; a section of the upper conveyor belt (13) and a section of the lower conveyor belt (14), which are located on the seedling pick-up side, are both seedling pick-up sections parallel to the seedling discharging section; lengths of the seedling discharging section and the seedling pick-up section satisfy that the first seedling dropping cup group (15) and the second seedling dropping cup group (16) are respectively located on the seedling discharging sections or the seedling pick-up sections; the plurality of seedling dropping cups of the first seedling dropping cup group (15) or the second seedling dropping cup group (16) located in the seedling discharging sections are able to pass through a position directly above the seedling discharging ports in sequence, so that the plug seedlings downwards pass through bottom openings of the seedling dropping cups and the seedling discharging ports in sequence;

one of two transverse ends of the conveyor belt base is a seedling supplementation side; a section of the upper conveyor belt (13) and a section of the lower conveyor belt (14), which are located on the seedling supplementation side, are seedling supplementation sections that extend in a straight line in a longitudinal direction of the conveyor belt base; the seedling supplementation sections are perpendicular to the seedling discharging sections; movement directions of the first seedling dropping cup group (15) and the second seedling dropping cup group (16) are from the seedling pick-up sections to the seedling supplementation sections, and then from the seedling supplementation sections to the seedling discharging sections; the seedling supplementation device is located on the seedling supplementation side and is close to the seedling supplementation sections; the seedling pick-up device is located on the seedling pick-up side and is close to the seedling pick-up sections;

the seedling pick-up device comprises a plug seedling conveyor belt (1); the plug seedling conveyor belt (1) is able to simultaneously convey a plurality of plug seedlings to a seedling pick-up position; the seedling pick-up position is located on one side of the plug seedling conveyor belt (1) close to the seedling pick-up sections; a supporting rod (2) is arranged on an outer side of the plug seedling conveyor belt (1); a top end of the supporting rod (2) is connected with a cover plate (3); a longitudinal guide rail (4) is arranged on a bottom side of the cover plate (3); a sliding block is arranged on the longitudinal guide rail (4); the sliding block is connected with a top end of a lifting cylinder (6); the cover plate (3) is further provided with a longitudinal conveying motor (5) capable of driving the sliding block and the lifting cylinder (6) to move along the longitudinal guide rail (4); a bottom end of the lifting cylinder (6) is connected with a transverse extension and retraction device (8) and a transverse cylinder (7) capable of driving the transverse extension and retraction device (8) to extend and contract in the transverse direction; a plurality of seedling pick-up mechanisms are mounted at intervals on the transverse extension and retraction device (8); each seedling pick-up mechanism comprises a seedling pick-up cylinder (9) and a seedling pick-up claw (10);

a seedling pick-up photoelectric sensor (11) is arranged on one side of the plug seedling conveyor belt (1); when the seedling pick-up photoelectric sensor (11) detects the plug seedlings at the seedling pick-up position, a controller enables the longitudinal conveying motor (5), the lifting cylinder (6), and the transverse cylinder (7) to cooperate to drive the plurality of seedling pick-up mechanisms to longitudinally approach the seedling pick-up position and transversely get together, thereby causing the plurality of seedling pick-up mechanisms to move above the plurality of plug seedlings located at the seedling pick-up position; a detection camera (12) is arranged on a top side of the conveyor belt base; the detection camera (12) takes photos of the plurality of plug seedlings located at the seedling pick-up position, so that the controller recognizes high-quality seedlings and low-quality seedlings at the seedling pick-up position up; the controller enables the pick-up cylinder (9) located above the high-quality seedlings to drive the seedling pick-up claw (10) to be opened and pick up the high-quality seedlings; after the seedling pick-up claw (10) picks up the high-quality seedlings, the controller makes the longitudinal conveying motor (5), the lifting cylinder (6), and the transverse cylinder (7) cooperate to drive the plurality of seedling pick-up mechanisms to longitudinally approach the seedling pick-up sections and be transversely separated, so that the plurality of seedling pick-up mechanisms respectively move above the plurality of seedling dropping cups of the first seedling dropping cup group (15) or the second seedling dropping cup group (16) located at the seedling pick-up sections; the controller opens the seedling pick-up claw (10) located above the seedling dropping cups, so that the plurality of high-quality seedlings fall into top openings of the plurality of seedling dropping cups of the first seedling dropping cup group (15) or the second seedling dropping cup group (16) respectively;

the seedling supplementation device comprises a seedling supplementation plate; the seedling supplementation plate is horizontally arranged and is located above the seedling dropping cups at the seedling supplementation sections; a seedling supplementation conveyor belt (24) is mounted above the seedling supplementation plate; the seedling supplementation conveyor belt (24) is connected with a plurality of seedling supplementation cups; seedling supplementation conveying motor (25) capable of driving the seedling supplementation conveyor belt (24) to move is mounted on the seedling supplementation plate, thereby forming a seedling supplementation cup group (26) capable of cyclically moving along with the seedling supplementation conveyor belt (24); a seedling supplementation port (27) is provided on one side of the seedling supplementation plate close to the seedling supplementation sections; the seedling supplementation port (27) is aligned with a bottom opening of the seedling supplementation cup located above the seedling supplementation port and the top opening of the seedling dropping cup located below the seedling supplementation port at the same time; a seedling supplementation photoelectric sensor (23) is arranged on the top side of the conveyor belt base; and when the seedling supplementation photoelectric sensor (23) detects that the seedling dropping cup located below the seedling supplementation port (27) is empty, the controller stops the movements of the upper conveyor belt (13) and the lower conveyor belt (14), and makes the seedling supplementation conveying motor (25) to drive the seedling supplementation cup group (26) to move, so that a seedling supplementation cup with a high-quality seedling moves above the seedling supplementation port (27), and the high-quality seedling stored in the seedling supplementation cup group (26) falls into the empty seedling dropping cup.

2. The efficient transplanting device with the automatic seedling pick-up and supplementation function according to claim 1, wherein a first seedling discharging port (19) and a second seedling discharging port (20) are provided on the seedling discharging plate close to the seedling discharging side; a bottom side of the first seedling discharging port (19) is covered with a first seedling discharging sliding plate (28); a first sliding plate cylinder (21) capable of driving the first seedling discharging sliding plate (28) to be opened or closed is arranged on a bottom side of the seedling discharging plate; a bottom side of the second seedling discharging port (20) is covered with a second seedling discharging sliding plate (29); and a second sliding plate cylinder (22) capable of driving the second seedling discharging sliding plate (29) to be opened or closed is arranged on the bottom side of the seedling discharging plate.

3. The efficient transplanting device with the automatic seedling pick-up and supplementation function according to claim 1, wherein a quantity of the seedling dropping cups of the first seedling dropping cup group (15) and a quantity of the seedling dropping cups of the second seedling dropping cup group (16) are the same, and the seedling discharging sections and the seedling pick-up sections have the same lengths.

4. The efficient transplanting device with the automatic seedling pick-up and supplementation function according to claim 1, wherein a conveying direction of the plug seedling conveyor belt (1) is parallel to a longitudinal direction; two supporting rods (2) are arranged on one side of the plug seedling conveyor belt (1) close to the seedling pick-up sections; top ends of the two supporting rods (2) are in matching connection with a cover plate (3); two longitudinal guide rails (4) are arranged on a bottom side of the cover plate (3); sliding blocks are respectively arranged on the two longitudinal guide rails (4); the two sliding blocks are respectively connected with top ends of respective lifting cylinders (6); two longitudinal conveying motors (5) capable of respectively driving the two sliding blocks to move are arranged on the cover plate (3); bottom ends of the two lifting cylinders (6) are respectively connected with a transverse extension and retraction device (8) and a transverse cylinder (7); and the two transverse cylinders (7) drive the two transverse extension and retraction devices (8) to extend or retract in opposite directions.

5. The efficient transplanting device with the automatic seedling pick-up and supplementation function according to claim 1, wherein the seedling discharging plate is a rectangular flat plate; the seedling supplementation plate is a circular flat plate; the seedling supplementation conveyor belt (24) is horizontally arranged; a projection of the seedling supplementation conveyor belt (24) facing the seedling supplementation plate is circular; and the projections of the upper conveyor belt (13) and the lower conveyor belt (14) facing the seedling discharging plate are the same rectangle.

\* \* \* \* \*